(12) United States Patent
Osborne et al.

(10) Patent No.: US 12,077,277 B2
(45) Date of Patent: Sep. 3, 2024

(54) EMBEDDED OUTBOARD INSULATION BLANKET STRINGER CLIP

(71) Applicant: The Boeing Company, Chicago, IL (US)

(72) Inventors: John C. Osborne, Bothell, WA (US); Steven A. Scott, Newcastle, WA (US); Valeriy A. Vinogradov, Kent, WA (US)

(73) Assignee: The Boeing Company, Chicago, IL (US)

( * ) Notice: Subject to any disclaimer, the term of this patent is extended or adjusted under 35 U.S.C. 154(b) by 177 days.

(21) Appl. No.: 17/670,244

(22) Filed: Feb. 11, 2022

(65) Prior Publication Data

US 2022/0315201 A1    Oct. 6, 2022

Related U.S. Application Data

(60) Provisional application No. 63/167,787, filed on Mar. 30, 2021.

(51) Int. Cl.
*B64C 1/40* (2006.01)
*F16B 2/20* (2006.01)

(52) U.S. Cl.
CPC ............. *B64C 1/403* (2013.01); *B64C 1/40* (2013.01); *F16B 2/20* (2013.01)

(58) Field of Classification Search
CPC ... B64C 1/403; B64C 1/40; F16B 2/20; F16B 2/02; F16B 2/12
USPC .... 248/682, 229.12, 229.14, 229.15, 229.16, 248/229.1, 229.2, 229.22, 229.24, 229.25; 269/43, 45, 6
See application file for complete search history.

(56) References Cited

U.S. PATENT DOCUMENTS

| | | | | |
|---|---|---|---|---|
| 551,259 | A * | 12/1895 | Calkins | A41H 15/00 81/15.8 |
| 4,021,890 | A * | 5/1977 | Kurosaki | F16B 5/0004 24/301 |
| 4,468,841 | A * | 9/1984 | Herington | F16M 11/041 24/67.5 |
| 4,590,727 | A * | 5/1986 | Ghahremani | E04D 13/1637 52/712 |
| 5,211,521 | A * | 5/1993 | Page | F16B 5/0642 411/182 |
| 7,658,044 | B2 * | 2/2010 | Roth | B64C 1/066 244/119 |
| 8,523,112 | B2 * | 9/2013 | Holvoet | F16L 3/245 244/119 |
| 8,540,191 | B2 * | 9/2013 | Sabadie | B64C 1/406 244/119 |

(Continued)

*Primary Examiner* — Nkeisha Smith
(74) *Attorney, Agent, or Firm* — Felix L. Fischer

(57) ABSTRACT

An insulation system for an aircraft fuselage uses a plurality of stringers extending longitudinally. An insulation blanket is configured for installation on the stringers and a plurality of stringer clips are attached to and extend from an outboard side of the insulation blanket. Each stringer clip has a connecting flange engaged to a cover of the insulation blanket. A first attachment arm extends outboard from a first end of the connecting flange and terminates in a first hook resiliently engaging the stringer. A second attachment arm extends outboard from a second end of the connecting flange and terminates in a second hook resiliently engaging the stringer.

20 Claims, 15 Drawing Sheets

(56) References Cited

U.S. PATENT DOCUMENTS

| | | | | |
|---|---|---|---|---|
| 8,622,348 B2* | 1/2014 | Sabadie | ............... | B64C 1/406 |
| | | | | 244/119 |
| 8,899,519 B2* | 12/2014 | Smith | ............... | F16L 59/029 |
| | | | | 52/404.1 |
| 9,669,775 B2* | 6/2017 | Yamamoto | ............... | F16B 2/20 |
| 9,988,137 B2* | 6/2018 | Borumand | ............... | B64C 1/403 |
| 10,273,991 B2* | 4/2019 | Fay | ............... | B64C 1/06 |
| 10,532,801 B2* | 1/2020 | Borumand | ............... | B64C 1/403 |
| 11,732,837 B2* | 8/2023 | Hurtado | ............... | B64C 1/403 |
| | | | | 248/228.6 |
| 2005/0082431 A1* | 4/2005 | Scown | ............... | B64C 1/406 |
| | | | | 244/119 |
| 2008/0189920 A1* | 8/2008 | Toombs | ............... | F16B 2/12 |
| | | | | 24/604 |
| 2012/0234979 A1* | 9/2012 | Smith | ............... | B64C 1/40 |
| | | | | 105/396 |
| 2014/0189986 A1* | 7/2014 | Carrillo | ............... | B64C 1/403 |
| | | | | 24/564 |
| 2016/0268965 A1* | 9/2016 | Stearns | ............... | H02S 40/32 |

* cited by examiner

EMBEDDED OUTBOARD INSULATION BLANKET STRINGER CLIP

REFERENCES TO RELATED APPLICATIONS

This application claims priority of U.S. provisional application Ser. No. 63/167,787 filed on Mar. 30, 2021 entitled EMBEDDED OUTBOARD INSULATION BLANKET STRINGER CLIP having a common assignee with the present application, the disclosure of which is incorporated herein by reference.

BACKGROUND INFORMATION

Field

Implementations of the disclosure relate generally insulation systems for aircraft and more particularly to stringer clips for attachment of insulation blankets to fuselage stringers.

Background

Commercial aircraft operate at a range of altitudes imposing large differential between outside air temperature and desired cabin temperatures. To maintain comfortable cabin temperatures, the fuselage of the aircraft is insulated. Current insulation systems employ clamps formed from stainless steel that secure insulation blankets by clamping a cap strip and return strip of the blankets over each frame in the fuselage structure. The configuration of current clamps compresses the insulation blanket at the attachment point on the frame negating local acoustic and thermal benefits of the insulation at the frame. The clamps are stiff and bending multiple clamps for installation throughout a shipset may present ergonomic issues for installers. Additionally, removing or relocating clamps may tear the insulation. The loss of insulation at the clip locations on the frame may exacerbate moisture management issues in service due to water condensation and freezing on the metallic clamps which engage the insulation blankets on the inboard side.

SUMMARY

As disclosed herein an insulation system for an aircraft fuselage uses a plurality of stringers extending longitudinally. An insulation blanket is configured for installation on the stringers and a plurality of stringer clips are attached to and extend from an outboard side of the insulation blanket. Each stringer clip has a connecting flange engaged to a cover of the insulation blanket. A first attachment arm extends outboard from a first end of the connecting flange and terminates in a first hook resiliently engaging the stringer. A second attachment arm extends outboard from a second end of the connecting flange and terminates in a second hook resiliently engaging the stringer.

The implementations disclosed allow a method for installation of an insulation blanket in a fuselage. A first attachment arm extending outboard from a first end of a connecting flange at a first acute angle and terminating in a first hook is resiliently displacing outwardly and resiliently engages a top plate of a stringer with the first hook. A second attachment arm extending outboard from a second end of the connecting flange at a second acute angle and terminating in a second hook is resiliently displacing outwardly and resiliently engages a bottom plate of the stringer with the second hook.

BRIEF DESCRIPTION OF THE DRAWINGS

The features, functions, and advantages that have been discussed can be achieved independently in various implementations of the present disclosure or may be combined in yet other implementations, further details of which can be seen with reference to the following description and drawings.

DETAILED DESCRIPTION

The implementations described herein provide an insulation system which avoids compressing the insulating blanket by using a plurality of flexible clips adhered to or embedded into the outboard surface of a cover on the insulation blankets. The flexible clip is of a thin gauge and can be easily plastically deformed thus reducing ergonomic issues in installation and removal. A connecting flange of the flexible clip is engaged to the cover film with extending attachment arms terminating in hooks to attach to stringers in the fuselage. Opening and closing the attachment arms to release or engage the hooks does not compromise the integrity of the insulation blanket material. Condensation cannot form on the flexible clip fastener inboard of the insulation blanket because the clip is located on the outboard surface of the blanket. Employing a plurality of clips on stringers between the frames reduces propensity for insulation blankets to sag thereby further enhancing moisture management to avoid condensation issues.

Figure 1A:
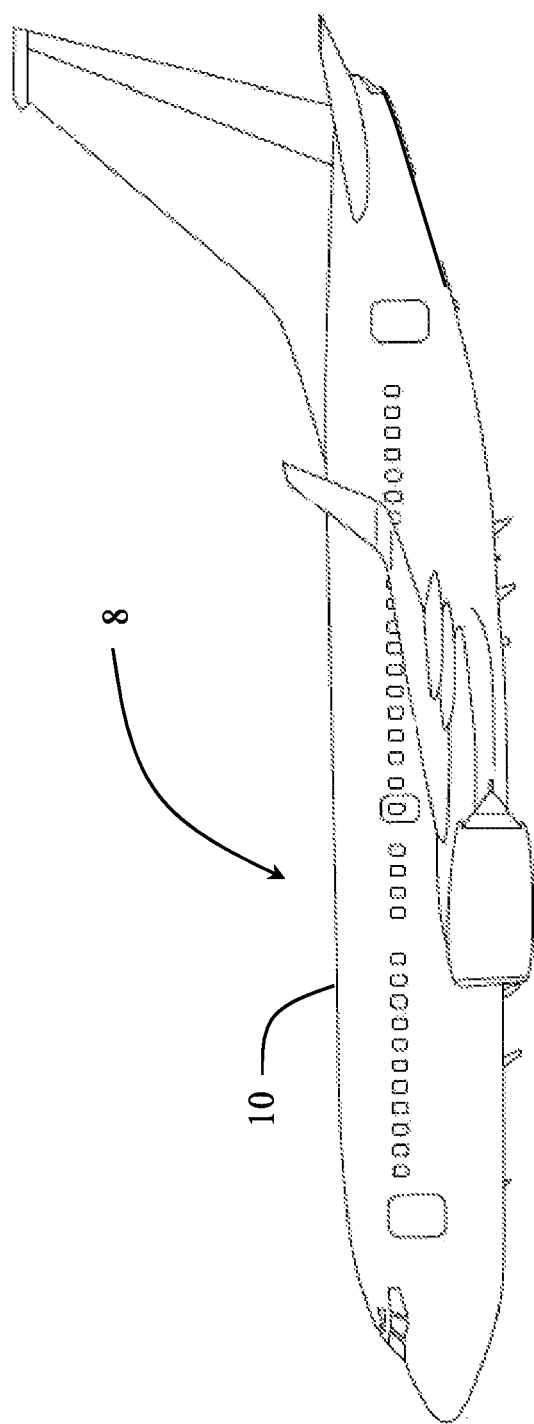
FIG. 1A is a pictorial representation of an aircraft in which the present implementations may be employed.
Figure 1B:
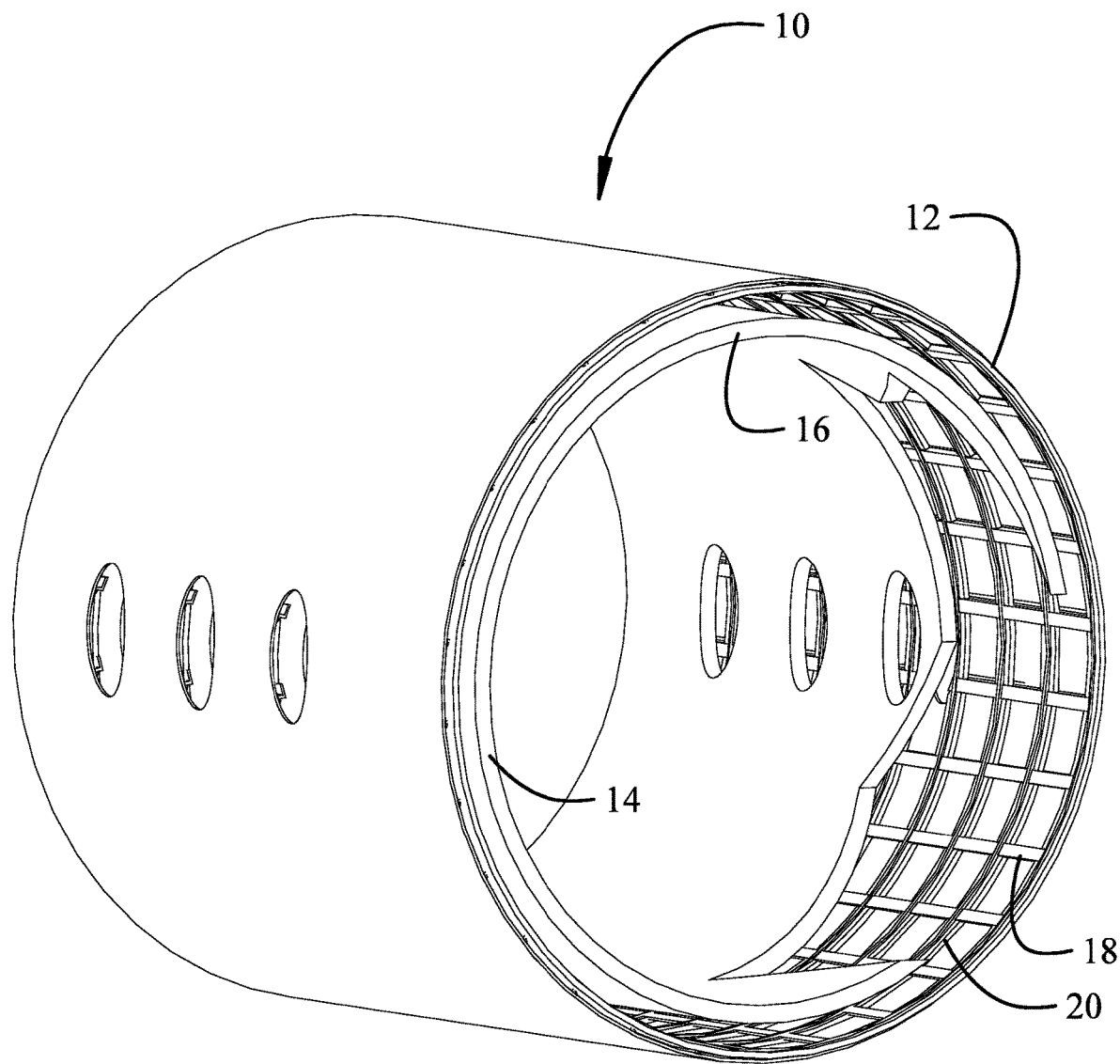
FIG. 1B is a pictorial view of a fuselage structure section with the interior panels sectioned and insulation removed to expose the structural members and skin.
Figure 2:
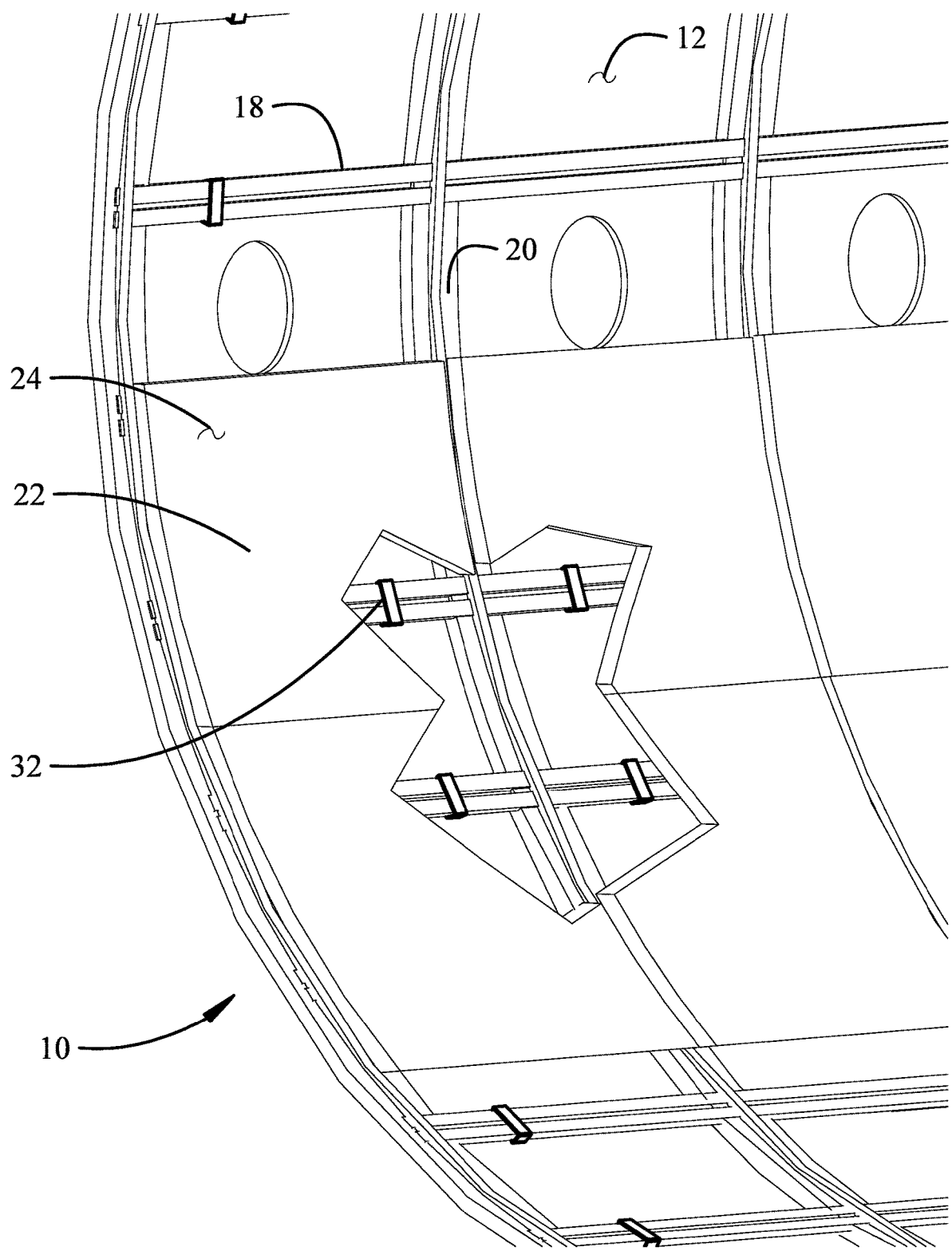
FIG. 2 is a pictorial partial end section view of the fuselage structure without the interior wall showing placement of the insulation blankets between structural members with sectioning to show clip positions.
Figure 3:
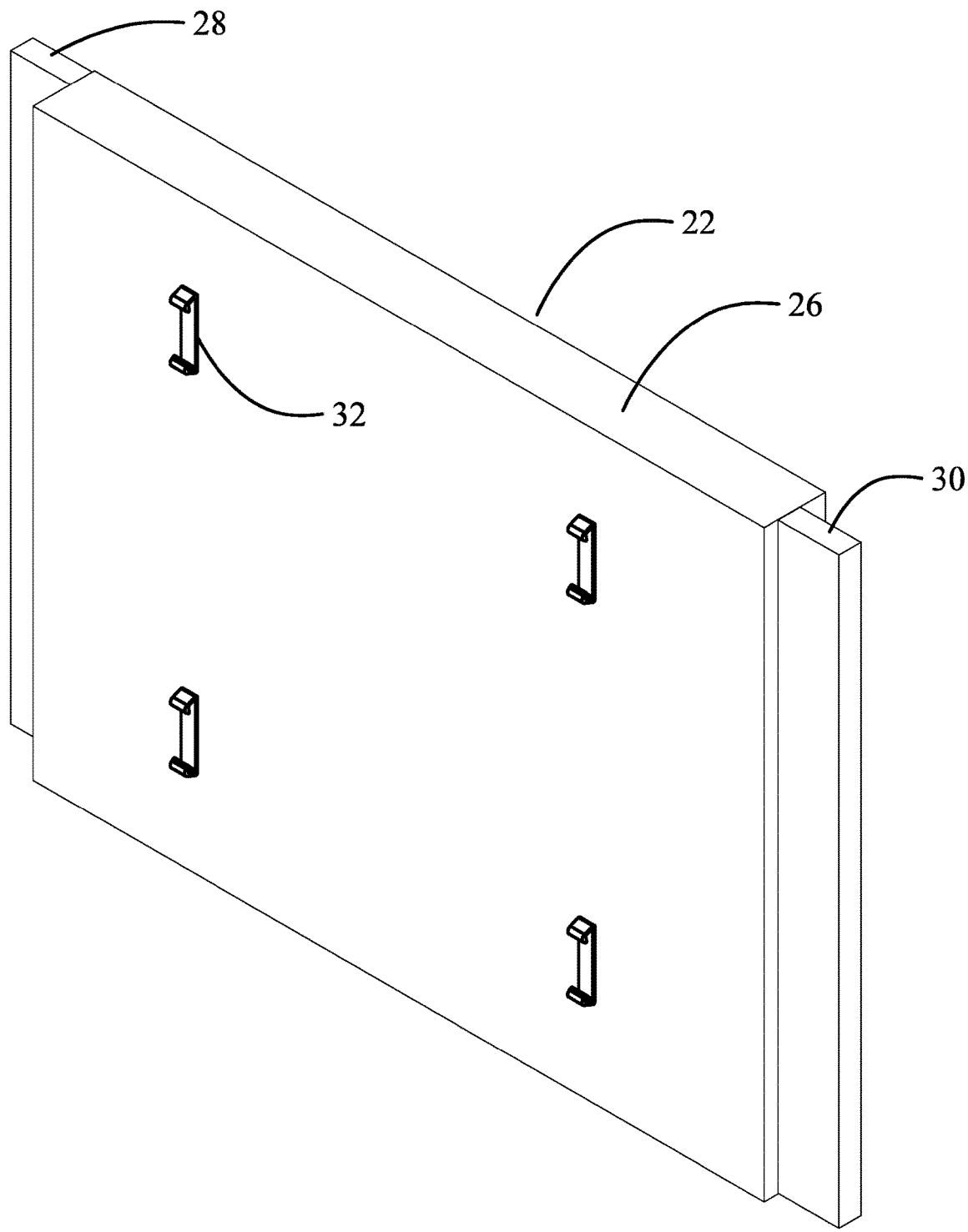
FIG. 3 is an outboard pictorial view of an insulation blanket with clips attached.
Figure 4:
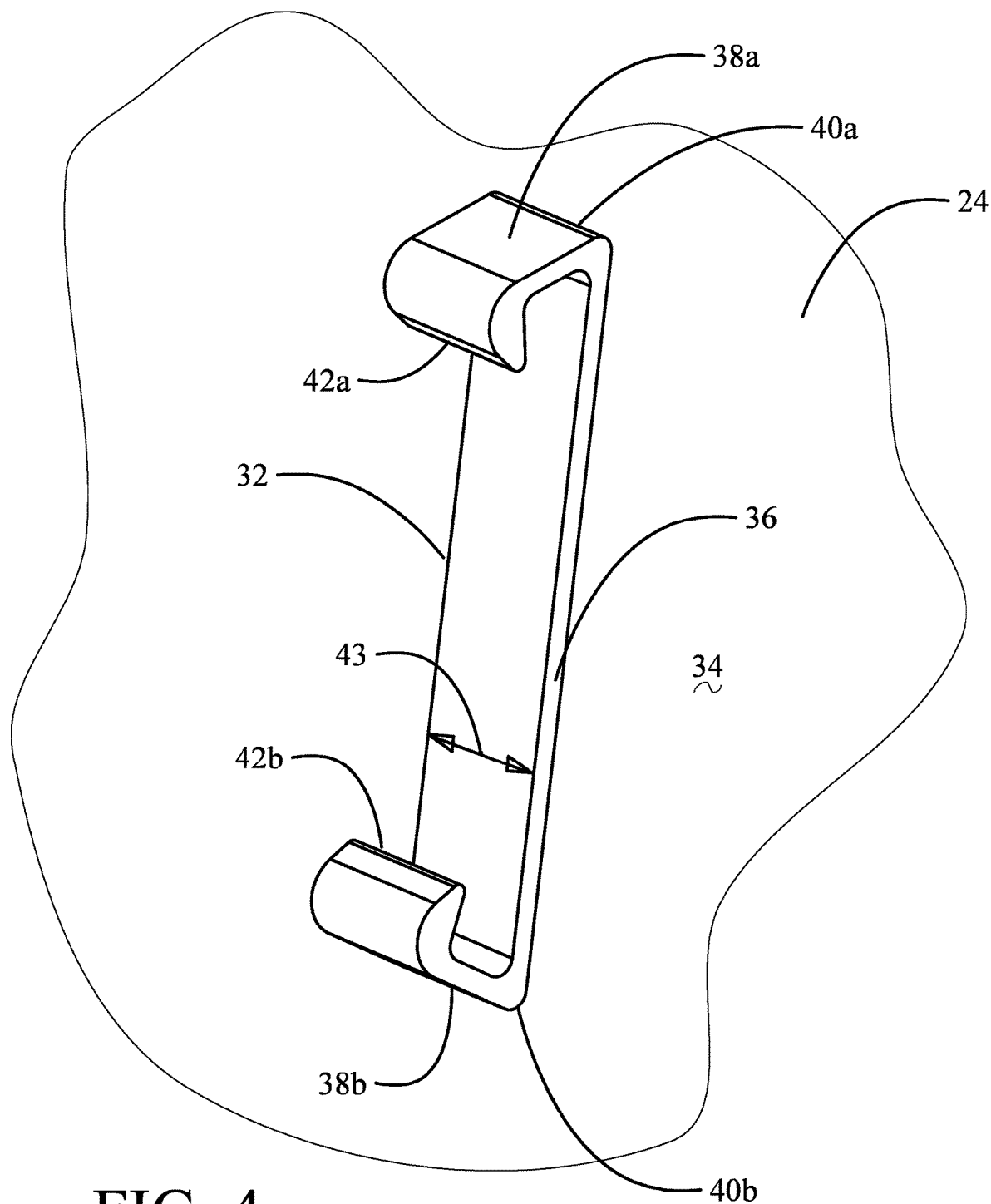
FIG. 4 is a detailed view of a first implementation of the clips.

FIG. 1A shows an aircraft 8 in which implementations as disclosed herein may be employed. A fuselage 10 of the aircraft 8 as seen in greater detail in FIG. 1B, fuselage 10 includes a structure having a skin 12, walls 14, a ceiling 16, and structural members. The structural members include a plurality of stringers 18 extending longitudinally between adjacent pairs of a plurality of frames 20. The wall 14 can be referred to as an interior wall or a sidewall and can be removable panels. The skin 12 is spaced from the walls 14 and ceiling 16 of a passenger cabin (or other compartment), and the volume between the wall 14 and skin 12 is at least partially filled with insulation blankets (not shown in FIG. 1B for clarity of the structural members).

As seen in FIGS. 2-6, a plurality of insulation blankets 22 are configured for mounting between the cabin interior walls 14 and the skin 12. Each insulation blanket 22 incorporates a waterproof film in a cover 24 which encapsulates or envelopes the batting in the insulation blanket 22. The insulation blankets 22 have a bay section 26 sized to be received between adjacent frames 20 and a cap strip 28 on a first longitudinal edge and a return 30 on an opposite longitudinal edge. The cap strip 28 on a first blanket overlaps the return 30 of an adjacent blanket over the intermediate frame 20 between the bay sections 26 of the first and adjacent blankets.

A plurality of clips 32 are attached on an outboard surface 34 of the insulation blanket 22 for attachment to the stringers 18. Each clip 32 has a connecting flange 36 with a pair of opposing engagement elements to secure the clip to the stringer. The connecting flange 36 is engaged to the cover 24 of the insulation blanket. In an exemplary implementation, the engagement elements for each clip 32 are a first attachment arm 38a and a second attachment arm 38b, the first attachment arm 38a extending outboard from a first end 40a of the connecting flange 36. and the second attachment arm 38b extending outboard from a second end 40b of the connecting flange 36. The first and second attachment arms 38a, 38b being resiliently deformable with the first attachment arm 38a terminating in a first hook 42a resiliently engaging the stringer 18 and the second attachment arm 38b terminating in a second hook 42b also resiliently engaging the stringer 18. The stringer 18 is trapped between the first and second attachment arms with the first and second hooks capturing the edges or plates of the stringer (as described subsequently).

The first attachment arm 38a extends from the connecting flange 36 at a first acute angle, $\alpha$, and the second attachment arm 38b extends from the connecting flange 36 at a second acute angle, $\beta$ (the angles $\alpha$ and $\beta$ defined inwardly from perpendicular with respect to the connecting flange 36). The first and second attachment arms 38a, 38b are resiliently deformable from the first and second angles toward perpendicularity from the connecting flange 36. The connecting flange 36 may also be resiliently deformable to assist in receiving the stringer 18 between the first and second hooks 42a, 42b extending from the first and second attachment arms 38a, 38b. Length 44 of the connecting flange receives a width 46 of the stringer 18 between the first attachment arm 38a and second attachment arm 38b.

Figure 5:
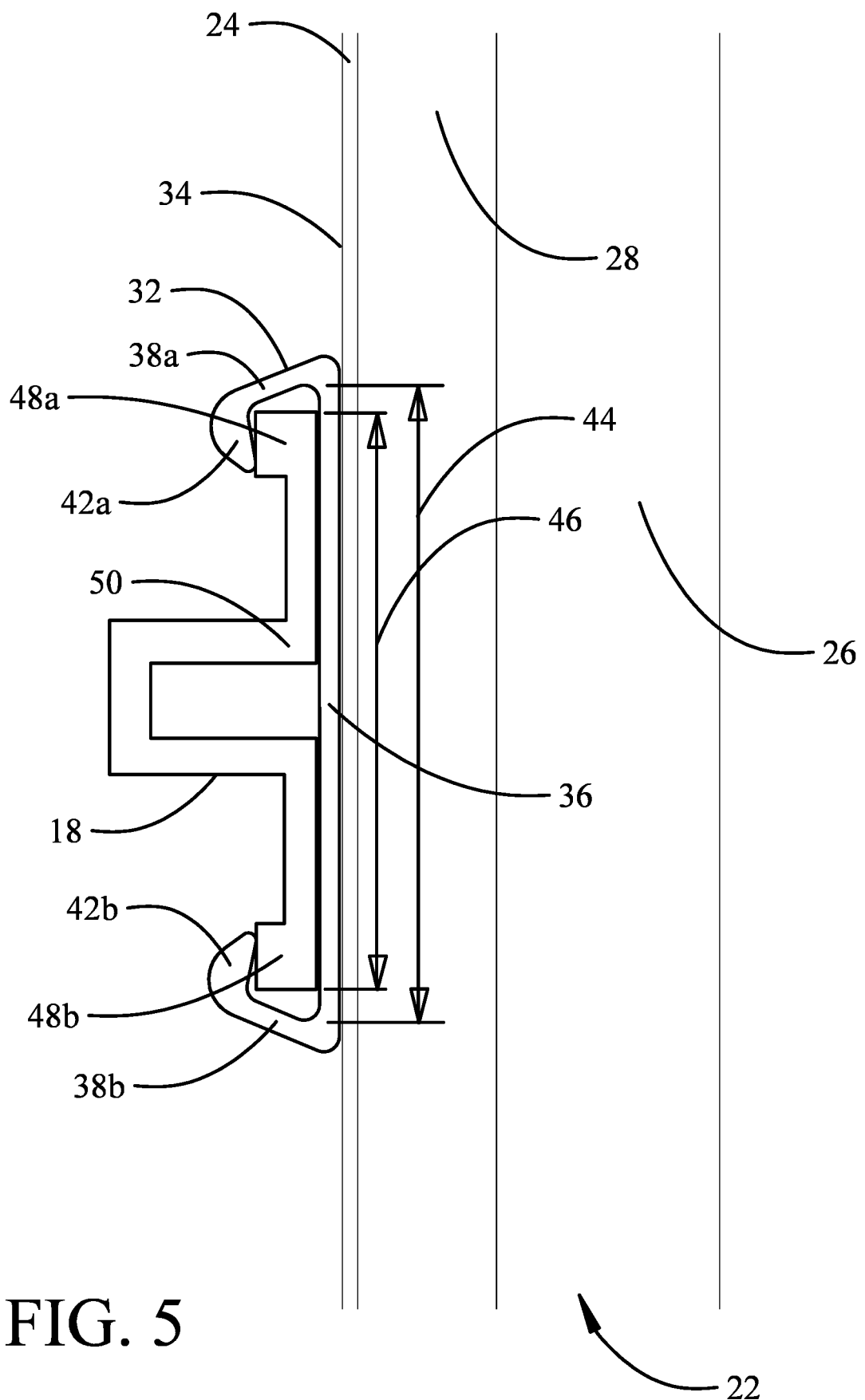
FIG. 5 is a detailed side view of the clip attached to the insulation blanket and engaged to a stringer.
Figure 6:
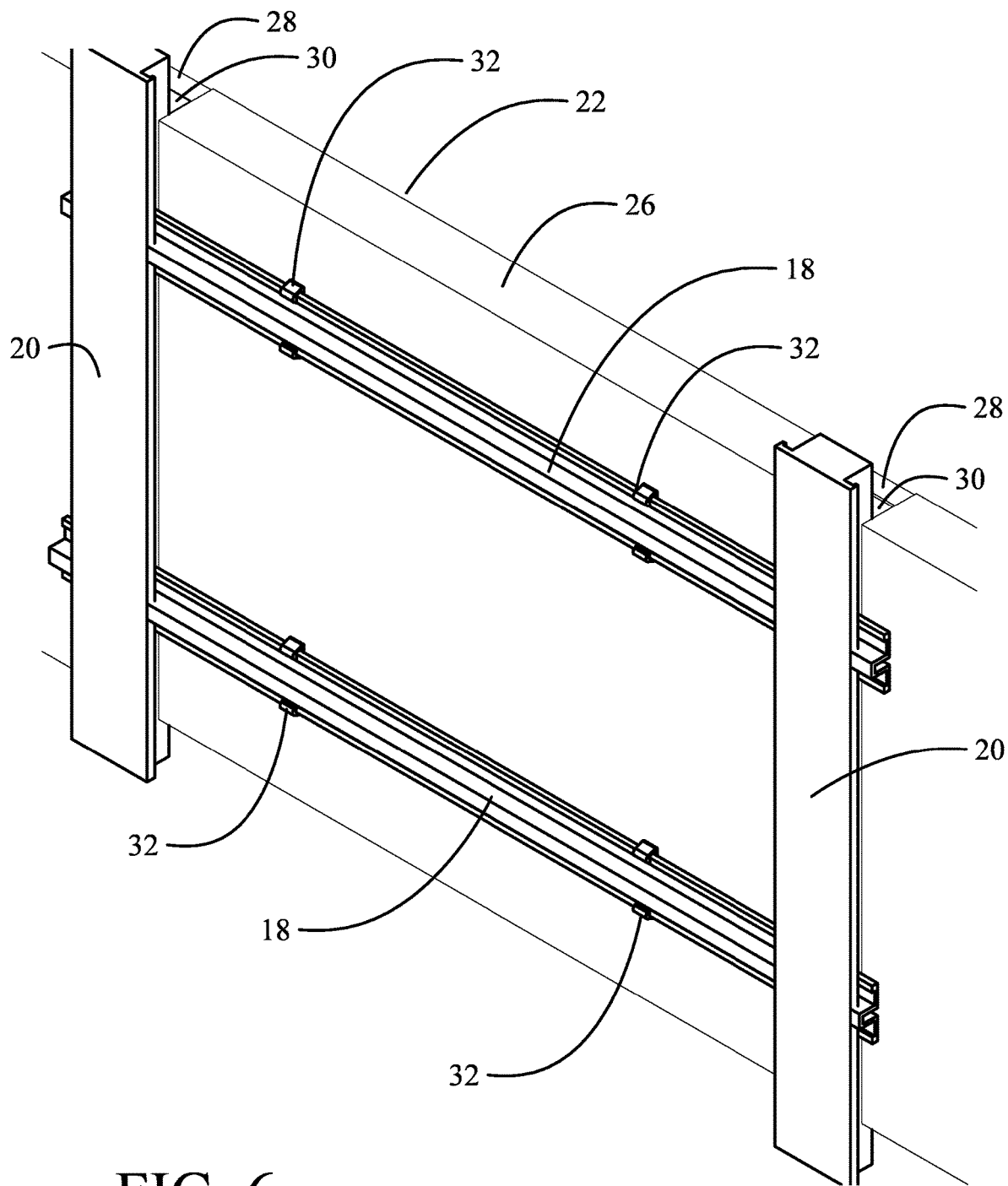
FIG. 6 is an outboard pictorial view of frames and stringers with insulation blankets attached with clips.
Figure 7:
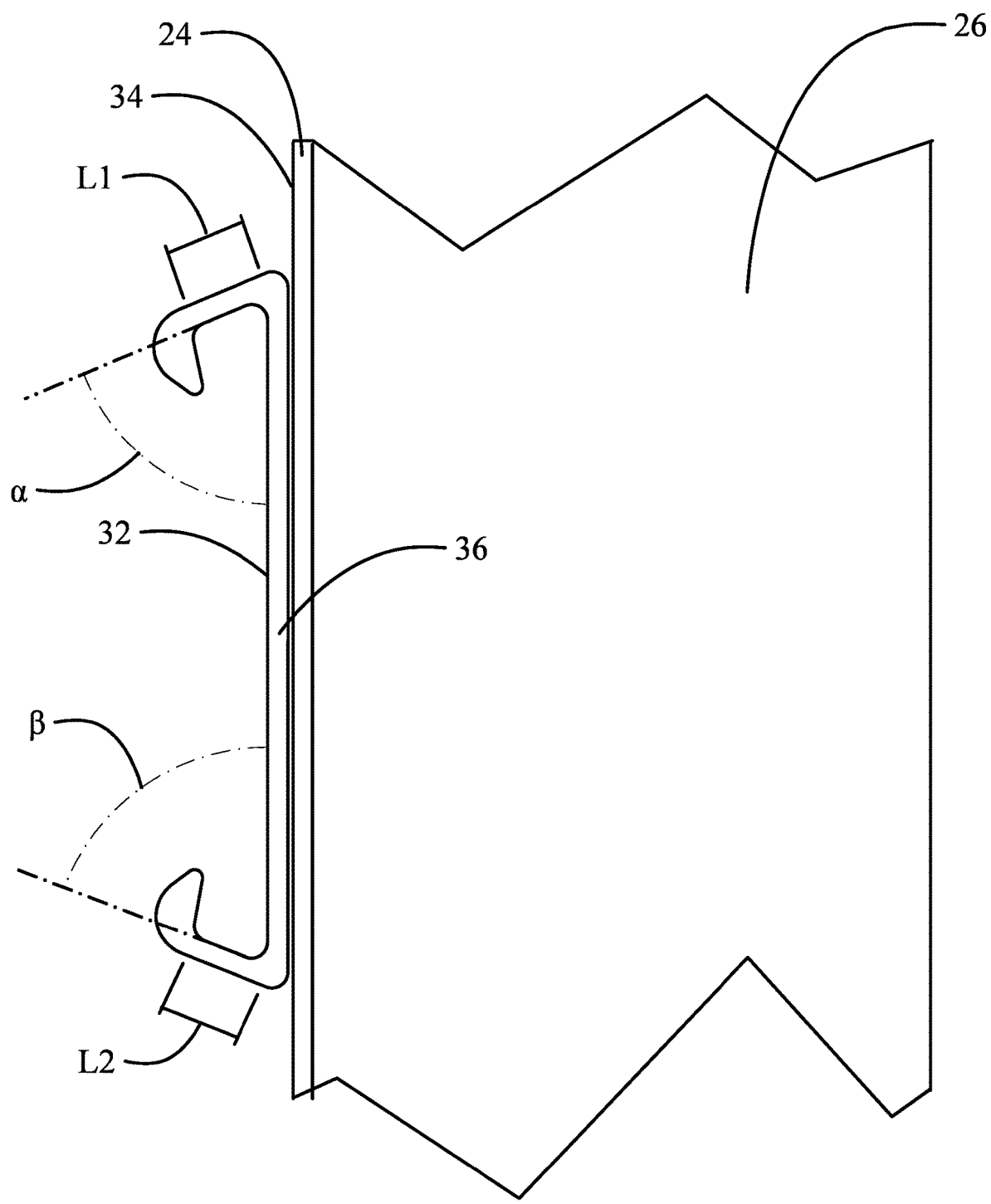
FIG. 7 is a side view of a first implementation of the clip affixed to an outboard surface of the cover of the insulation blanket.

As best seen in FIG. 5, each stringer has a web 50 extending between a top plate 48a and a bottom plate 48b. The first and second hooks 42a, 42b capture the edges of the stringer by engaging the top plate 48a and the bottom plate 48b of the stringer 18. The first attachment arm 38a has a length, L1, and a depth of the top plate 48a is less than or equal to L1 and greater than or equal to L1 sin $\alpha$. The second arm 38b has a length, L2, and a depth of the bottom plate 48b is less than or equal to L2 and greater than or equal to L2 sin $\beta$. The first hook 42a is received over an outboard end of the top plate and the second hook 42b is received over an outboard end of the bottom plate by flexing the attachment arms outward.

In the implementation shown, the stringer 18 is symmetrical, with the top plate 48a and bottom plate 48b equal in depth, and $\alpha$ equals $\beta$. In an example implementation, $\alpha$ and $\beta$ are less than or equal to 70°.

Figure 8:
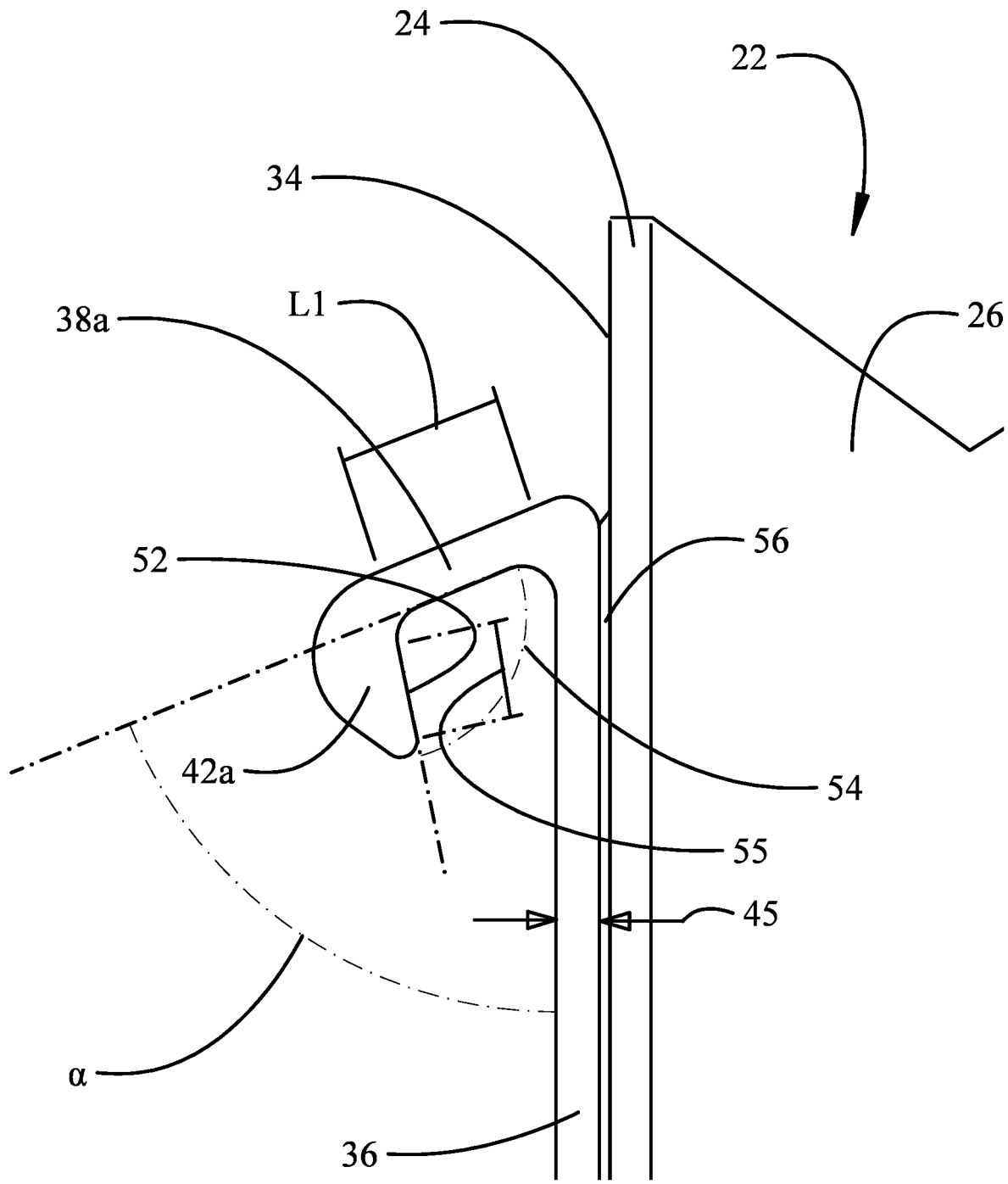
FIG. 8 is a detailed pictorial view of one attachment arm of the clips.

As shown in detail in FIG. 8, the first and second hook 42a, 42b each have a flat engagement surface 52 extending at an obtuse angle 54 from the first and second attachment arm 38a, 38b. This configuration allows firm grasping engagement of the top and bottom plates 48a, 48b by the clip 32 over a range of flexure of the attachment arms 38a, 38b. In the implementation shown, the obtuse angle 54 is greater than or equal to 109°.

Figure 9:
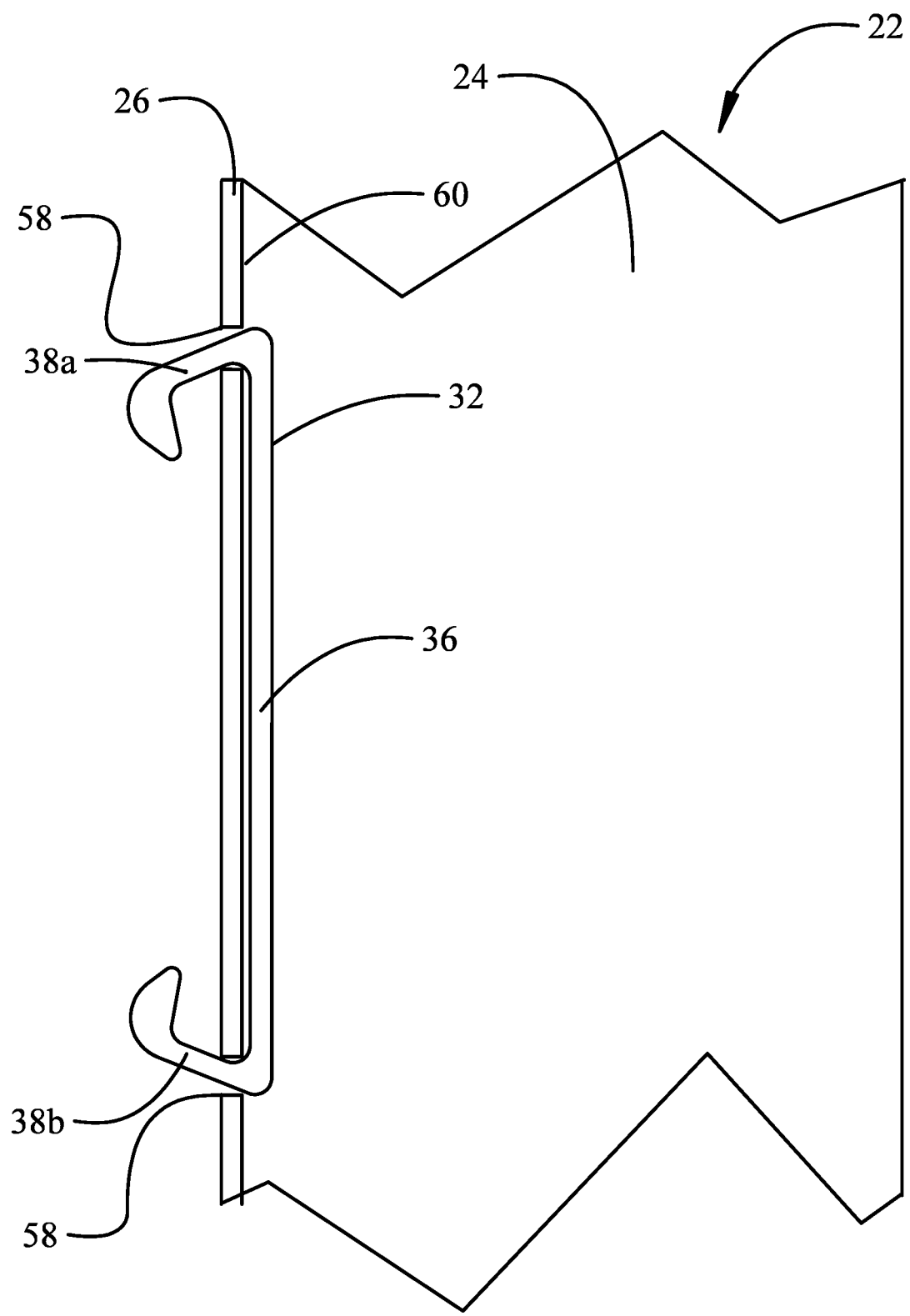
FIG. 9 is side view of the first implementation of the clip extending through the outboard surface of the cover.

In a first example implementation the connecting flange 36 is bonded to the outboard surface 34 of the cover 24 with an adhesive layer 56 as best seen in FIG. 8. In an alternative implementation seen in FIG. 9, the clip 32 is restrained internal to the cover 24 with the attachment arms 38, 38b extending through apertures 58 in the cover. The connecting flange 36 may be adhesively bonded to an interior surface 60 of the cover 24 or may be constrained by the insulation material in the bay section 26 pressing the connecting flange 36 against the interior surface 60.

Figure 10:
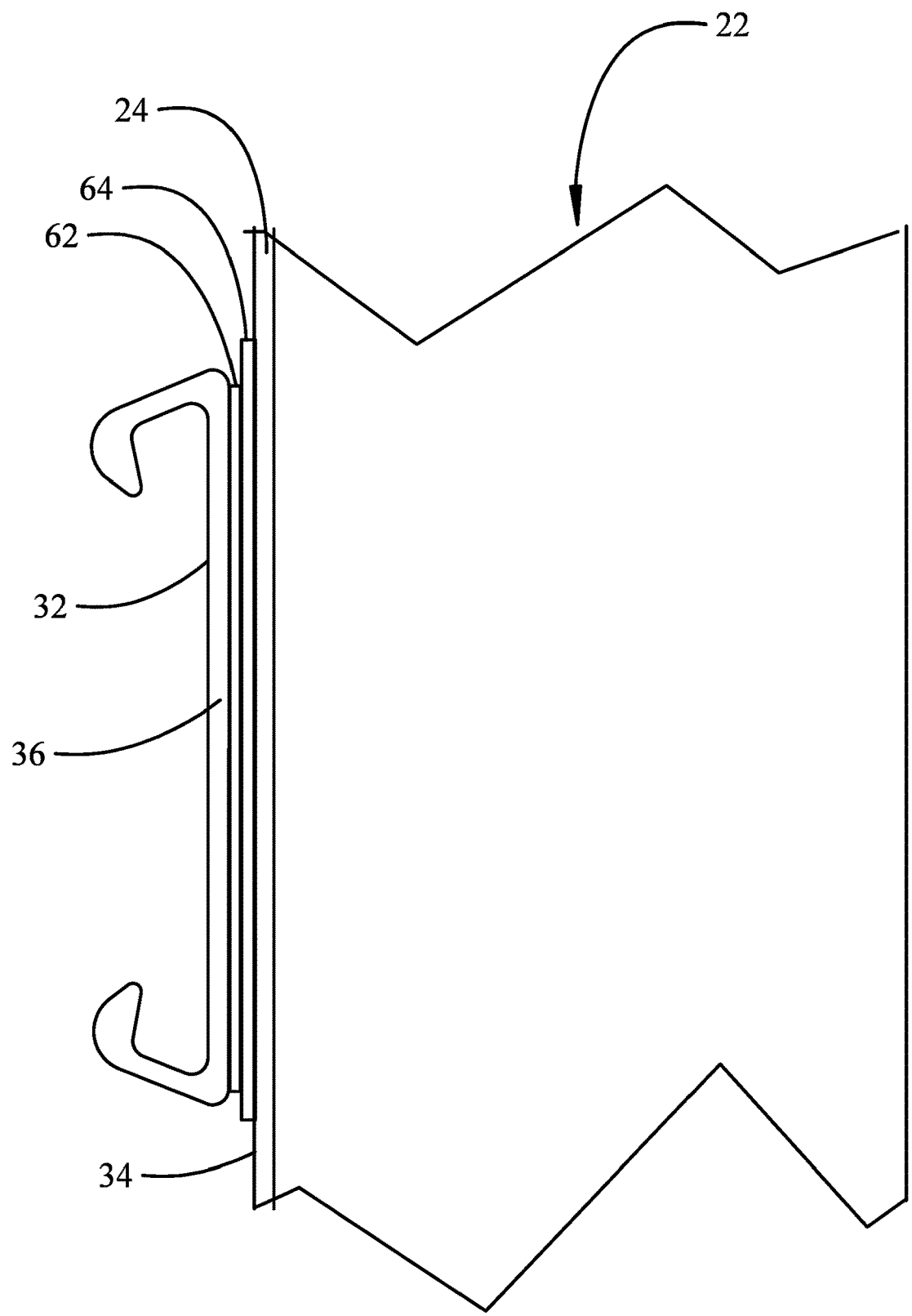
FIG. 10 is side view of a the clip allowing attachment with attachment to the cover with hook and loop fasteners.

In a second alternative implementation seen in FIG. 10, the connecting flange 36 is engaged to the cover with hook and loop fasteners having a first moiety 62 attached to the connecting flange 36 and a second moiety 64 attached to the outboard surface 34 of the cover 24.

Figure 11:
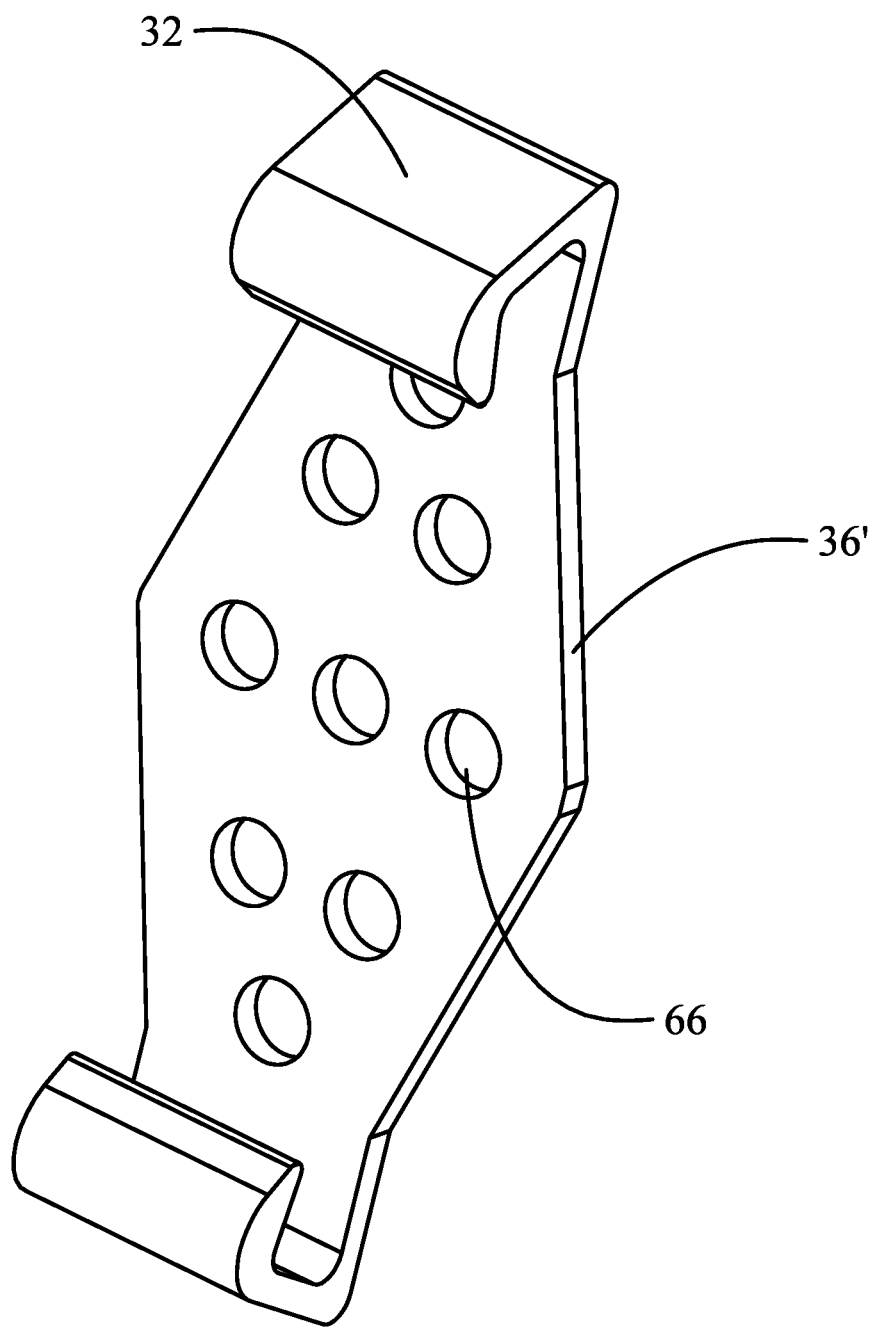
FIG. 11 is a pictorial view of a second implementation of the clip with a diamond shaped connecting flange.
Figure 12:
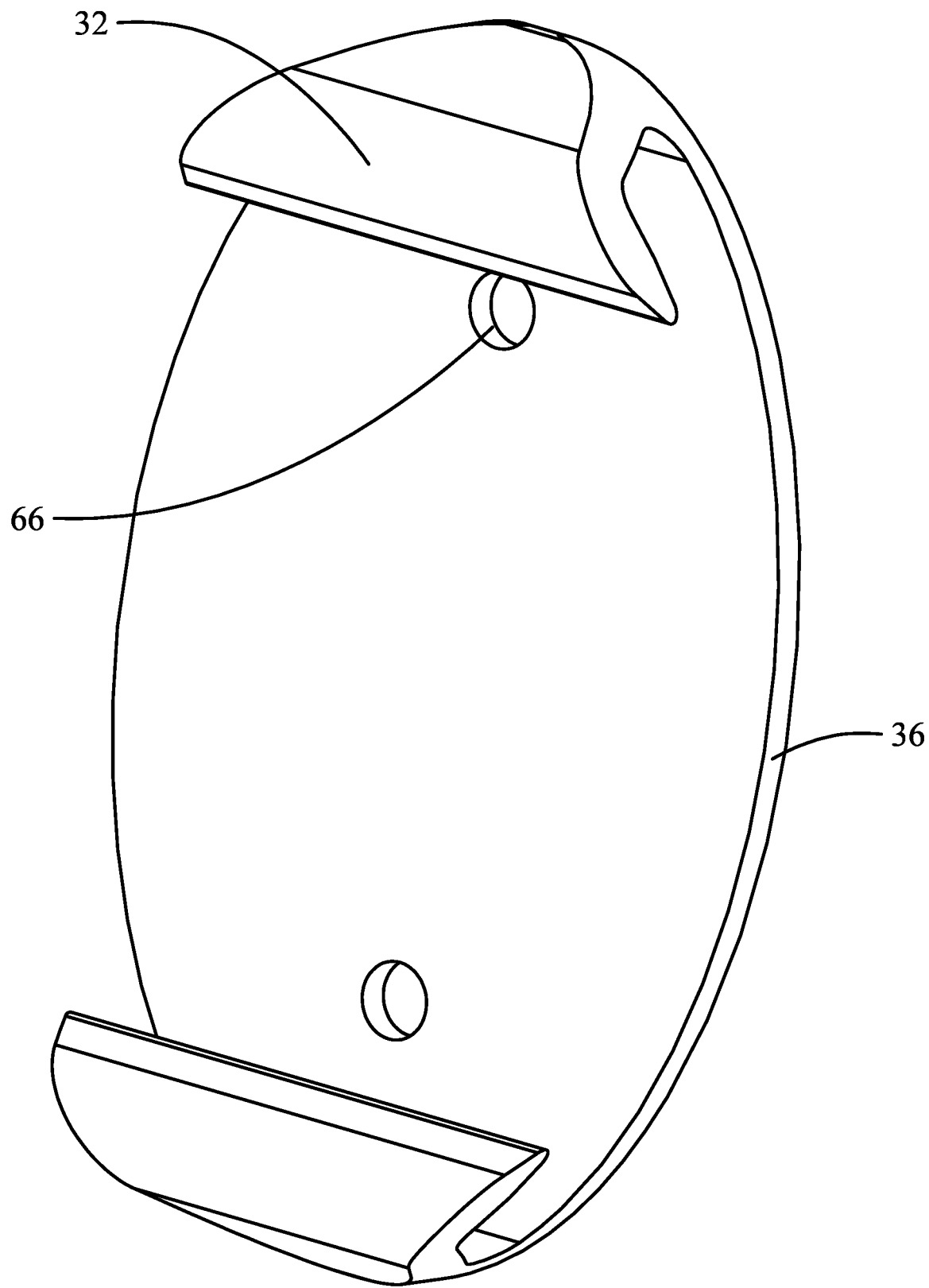
FIG. 12 is a pictorial view of a third implementation of the clip with an ovaloid shaped connecting flange.

In the implementations shown in FIGS. 2-10, the connecting flange 36 of the clip 32 is rectangular in planform. Alternative geometric arrangements of the connecting flange 36 are incorporated to alter flexibility or deformation characteristics or for attachment area to the insulation blanket 22. FIG. 11 shows an example implementation with a modified diamond or tetrahedral shape connecting flange 36'. FIG. 12 shows a second example implementation with an ovaloid shape connecting flange 36".

Figure 13:
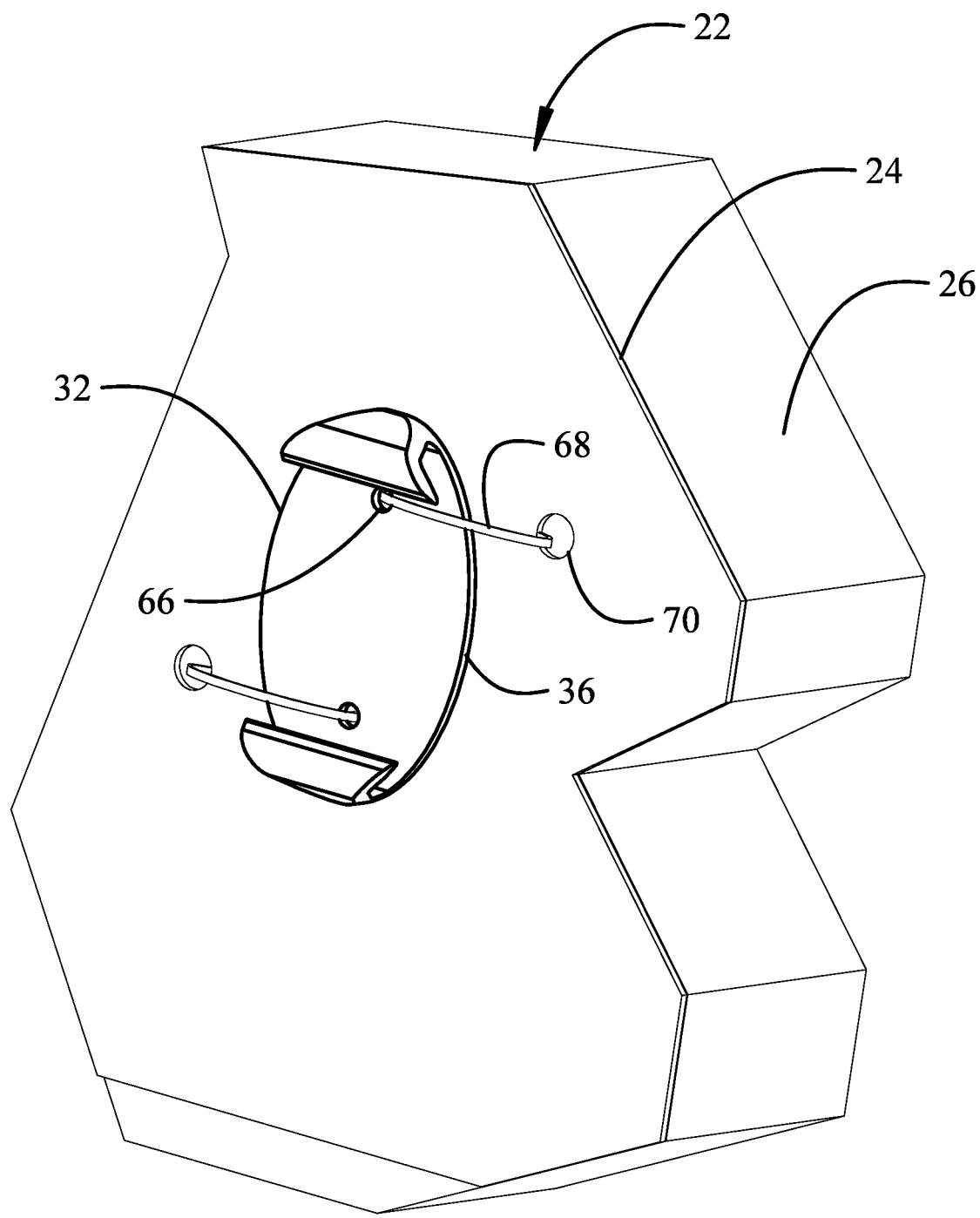
FIG. 13 is a pictorial view of the third implementation attached to the cover with loop fasteners; and, FIG. 14 is a flow chart depicting a method for installation of an insulation blanket in a fuselage of an aircraft.

The connecting flange in certain implementations additionally incorporates one or a plurality of apertures 66 as seen in FIGS. 11 and 12. The apertures 66 may provide weight reduction or assist in adhesion of the bonding layer. The apertures 66 additionally provide an alternative securing structure for the connecting flange 36 as shown in FIG. 13 wherein loop ties 68, extending through selected ones of the apertures 66, are engaged to the cover 24 to secure the clip 32 to the cover or supplement one of the previously disclosed implementations for securing the clip to the cover. The loop ties 68 may extend through holes 70 in the cover 24 or may pierce the cover similar to garment hang tag loops.

For the necessary resilient flexibility of the attachment arms 38a, 38b and connecting flange 36, the clip 32 is fabricated from a semi-rigid, durable yet elastic material, capable of operating without fracture in a cyclical temperature cover spanning −70 to 200 degrees Fahrenheit. The material desirably has chemical resistance properties for use in an aircraft manufacturing and operational environment. In example implementations, polyetherimide (PEI), such as Ultem 1000 or Ultem 9085, may be employed. In alternative implementations, silicon, a high-performance polyamide resin such as Zytel 103, or nylon materials such as Nylon 6/6 are employed.

In an example implementation configured as shown in FIGS. 4-8, L1 and L2 are greater than or equal to 0.12 inch (3.048 millimeter). The connecting flange 36 has a width 43 greater than 0.48 inch (12.192 millimeter) and the length 44 is less than 2.1 inches (53.34 millimeter). The flat engagement surface 52 of the hooks 42a, 42b has a depth 55 of less than 0.13 inch (3.302 millimeter). The connecting flange has a thickness 45 of less than or equal to 0.06 inch (1.524 millimeter).

Figure 14:
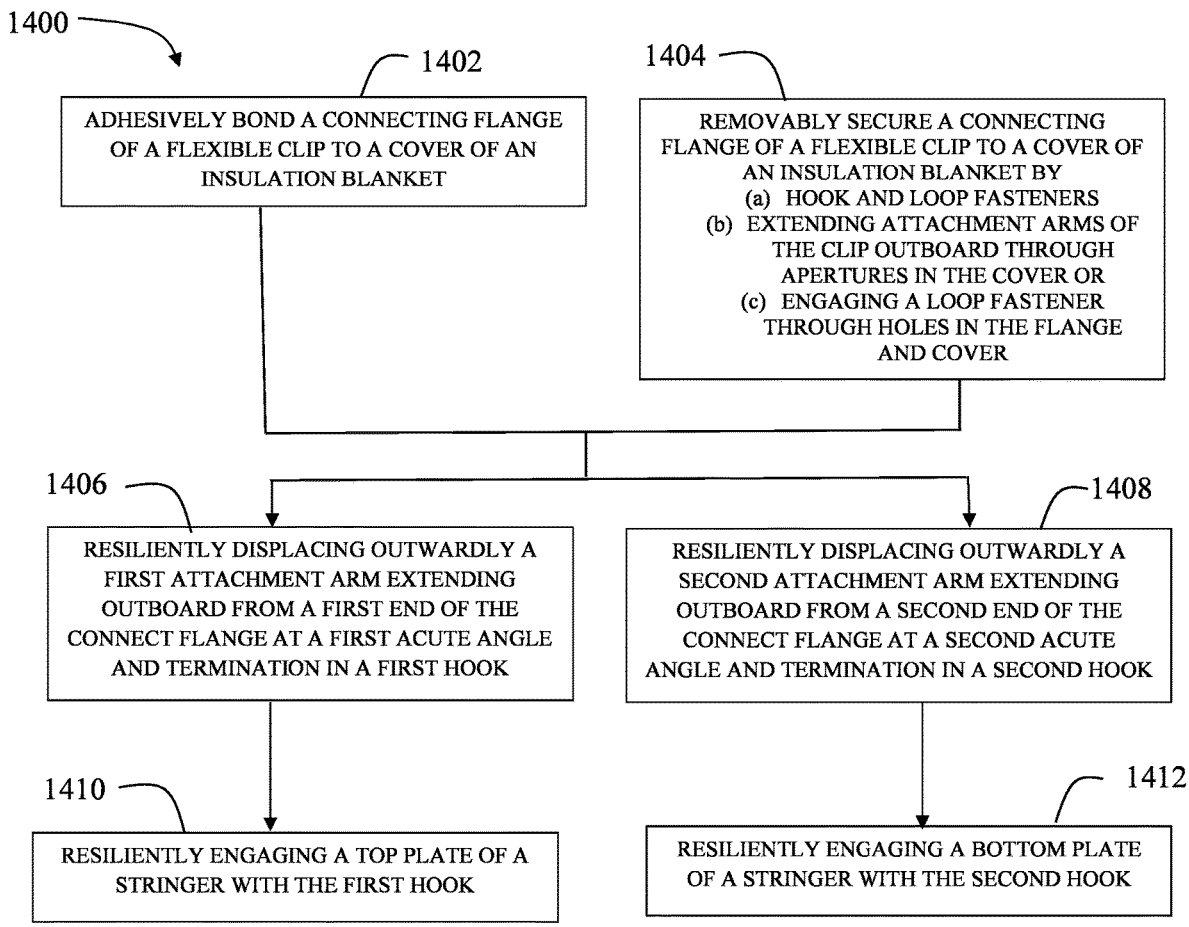

The implementations disclosed provide a method 1400 for installation of an insulation blanket in a fuselage as shown in FIG. 14. A connecting flange of a flexible clip is adhesively bonded to a cover of the insulation blanket, 1402. Alternatively, the connecting flange is removably engaged to a cover of the insulation blanket, step 1404. The connecting flange is removably secured with hook and loop fasteners in a first implementation, constrained within the cover by extending attachment arms of the clip outboard through apertures in the cover in a second implementation, or secured to the cover with loop fasteners in a third implementation. A first attachment arm extending outboard from a first end of the connecting flange at a first acute angle and terminating in a first hook is resiliently displacing outwardly, step 1406. A top plate of a stringer is resiliently engaged with the first hook, step 1408. A second attachment arm extending outboard from a second end of the connecting flange at a second acute angle and terminating in a second hook is resiliently displacing outwardly, step 1410, and a bottom plate of the stringer is resiliently engaged with the second hook, step 1412.

Having now described various implementations of the disclosure in detail as required by the patent statutes, those skilled in the art will recognize modifications and substitutions to the specific implementations disclosed herein. Such modifications are within the scope and intent of the present disclosure as defined in the following claims. As used herein, the terms "inboard" and "outboard", "upper" and "lower", "top" and "bottom" are relative positions with respect to the example implementations as shown in the drawings and are not limiting.

What is claimed is:

1. An insulation system for an aircraft fuselage having a plurality of stringers extending longitudinally, the system comprising:
    an insulation blanket configured for installation on the stringers; and
    a plurality of stringer clips attached to and extending from an outboard surface of the insulation blanket, each stringer clip having:
        a connecting flange engaged to a cover of the insulation blanket;
        a first attachment arm extending outboard from a first end of the connecting flange and terminating in a first hook resiliently engaging a top plate of the stringer; and
        a second attachment arm extending outboard from a second end of the connecting flange and terminating in a second hook resiliently engaging a bottom plate of the stringer.

2. An insulation system for an aircraft fuselage having a plurality of stringers extending longitudinally and a plurality of frames, the plurality of stringers extending longitudinally between adjacent pairs of the plurality of frames, the system comprising:
    an insulation blanket configured for installation on the stringers; and
    a plurality of stringer clips attached to and extending from an outboard surface of the insulation blanket, each stringer clip having:
        a connecting flange engaged to a cover of the insulation blanket;
        a first attachment arm extending outboard from a first end of the connecting flange and terminating in a first hook resiliently engaging the stringer; and
        a second attachment arm extending outboard from a second end of the connecting flange and terminating in a second hook resiliently engaging the stringer, and
    wherein the insulation blanket has a bay section disposed intermediate an adjacent pair of frames, the bay section has a cap strip on a first end and a return strip on a second end, the cap strip configured to engage the return strip of an adjacent insulation blanket over an intermediate one of the plurality of frames.

3. The insulation system as defined in claim 2 wherein the first attachment arm extends from the connecting flange at a first acute angle ($\alpha$) and the second attachment arm extends from the connecting flange at a second acute angle ($\beta$) the first attachment arm and the second attachment arm resiliently deformable from the first and second angles toward perpendicularity from the connecting flange.

4. The insulation system as defined in claim 3 wherein a length of the connecting flange receives a width of the stringer between the first attachment arm and second attachment arm.

5. The insulation system as defined in claim 4 wherein each stringer has a web extending between a top plate and a bottom plate and the first attachment arm has a length (L1) and a depth of the top plate is less than or equal to L1 and greater than or equal to L1 sin $\alpha$, and the second attachment arm has a second length (L2) and a depth of the bottom plate is less than or equal to L2 and greater than or equal to L2 sin $\beta$, thereby receiving the first hook over an outboard end of the top plate and the second hook over an outboard end of the bottom plate.

6. The clip as defined in claim 5 wherein the first acute angle ($\alpha$) is less than or equal to 70°.

7. The clip as defined in claim 5 wherein the clip comprises material selected from the set of polyetherimide (PEI), silicon, polyamide resin, or nylon.

8. The insulation system as defined in claim 1 wherein the connecting flange is adhesively bonded to the cover.

9. The insulation system as defined in claim 1 wherein the connecting flange is engaged to the cover with hook and loop fasteners.

10. The insulation system as defined in claim 1 wherein the connecting flange incorporates a plurality of apertures.

11. The insulation system as defined in claim 10 wherein the connecting flange is engaged to the cover with loop ties extending through selected ones of the plurality of apertures.

12. A clip for engagement of an insulation blanket to a structural member, the clip comprising:
    a connecting flange; and
    a pair of engagement elements at opposing ends of the connecting flange, the engagement elements comprising a first attachment arm extending from the connecting flange and terminating in a first hook, a second attachment arm extending from the connecting flange and terminating in a second hook wherein the first attachment arm extends at a first acute angle ($\alpha$) from the connecting flange and the second attachment arm extends at a second acute angle ($\beta$) and the first and second hooks extend at an obtuse angle from the first and second attachment arms, wherein the first attachment arm and the second attachment arm are resiliently deformable from the first acute angle and the second acute angle toward perpendicularity from the connecting flange, and wherein the structural member comprises a stringer having a web extending between a top plate and a bottom plate and the first attachment arm has a first length (L1), whereby a depth of the top plate is less than or equal to the first length (L1) and greater than or equal to L1 sin α, and the second arm has a second length (L2), and a depth of the bottom plate is less than or equal to the second length (L2) and greater than or equal to L2 sin α, whereby the first hook is received over an outboard end of the top plate and the second hook is received over an outboard end of the bottom plate.

13. The clip as defined in claim 12 wherein the first acute angle (α) is less than or equal to 70°.

14. The clip as defined in claim 12 wherein the first length (L1) and the second length (L2) are greater than or equal to 0.12 inch (3.048 millimeter).

15. The clip as defined in claim 12 wherein the connecting flange has a width greater than 0.48 inch (12.192 millimeter).

16. The clip as defined in claim 12 wherein the connecting flange has a thickness of less than or equal to 0.06 inch (1.524 millimeter).

17. The clip as defined in claim 12 wherein the clip comprises material selected from the set of polyetherimide (PEI), silicon, polyamide resin, or nylon.

18. A method for installation of an insulation blanket in a fuselage, the method comprising:

resiliently displacing outwardly a first attachment arm extending outboard from a first end of a connecting flange at a first acute angle and terminating in a first hook;

resiliently engaging a top plate of a stringer with the first hook;

resiliently displacing outwardly a second attachment arm extending outboard from a second end of the connecting flange at a second acute angle and terminating in a second hook; and resiliently engaging a bottom plate of the stringer with the second hook.

19. The method as defined in claim 18 further comprising removably engaging the connecting flange to a cover of the insulation blanket.

20. The method as defined in claim 18 further comprising adhesively bonding the connecting flange to a cover of the insulation blanket.

* * * * *